United States Patent [19]

Brown

[11] Patent Number: 4,805,446

[45] Date of Patent: Feb. 21, 1989

[54] PORTABLE MEANS FOR TESTING AUTOMATIC TRANSMISSIONS

[76] Inventor: Robert J. Brown, 3297 Bedford Rd., Hastings, Mich. 49058

[21] Appl. No.: 114,755

[22] Filed: Oct. 30, 1987

[51] Int. Cl.$^4$ .......................................... G01M 19/00
[52] U.S. Cl. .................................................. 73/118.1
[58] Field of Search .................. 73/118.1; 74/16, 840; 248/666, 667, 672

[56] References Cited

U.S. PATENT DOCUMENTS 4,356,724 11/1982 Agoub et al. ...................... 73/118.1
4,489,594 12/1984 Smith .................................... 73/49.7

*Primary Examiner*—Jerry W. Myracle
*Attorney, Agent, or Firm*—Price, Heneveld, Cooper, DeWitt & Litton

[57] ABSTRACT

A machine for testing the integrity of a rebuilt or overhauled automatic transmission includes a saddle having adjustable supports by which it can be attached to the bell housing of the transmission. The saddle mounts a shaft equipped with means to effect a driving connection with the torque converter used with the transmission. The saddle also includes a power input shaft to which can be attached a portable power source such as a drill motor to operate the transmission prior to reinstallation in the vehicle.

4 Claims, 2 Drawing Sheets

PORTABLE MEANS FOR TESTING AUTOMATIC TRANSMISSIONS

FIELD OF THE INVENTION

The invention relates to portable equipment to be used to test an automatic transmission which has been repaired or rebuilt to determine whether it is ready for installation in the vehicle from which it was removed.

BACKGROUND OF THE INVENTION

Many types of equipment are today equipped with automatic transmissions. These transmissions, for one reason or another, have to be overhauled or repaired. In some types of industrial equipment, the transmissions have a particularly long life or are operated under particularly harsh conditions, necessitating overhaul or repair, either as a matter of standard maintenance procedures or as a matter of necessity. Such transmissions are used, not only in passenger automobiles, but also in trucks, tractors, forklifts and various other types of industrial and commercial vehicular equipment. These transmissions are heavy and the time consumed in removing them for service and reinstalling them after the service has been completed is substantial. For example, in the conventional forklift, the reinstallation time is normally five or more hours. This type of equipment is complex and it would be particularly desirable to determine whether the rebuilding or repair has been successful and, thus, the transmission is ready for reuse prior to its reinstallation in the vehicle. Until now, this has not been possible and, thus, should the transmission be installed and found to be faulty in some manner, not only are the four or five hours of reinstallation lost but also the additional hours required for removal are also lost.

Large stationary testing equipment is available in those facilities where the transmissions are manufactured. Such installations are not practical nor within the budget means of the average small or medium size shop doing field repair and rebuilding of used equipment. It is not only too expensive but also it is too bulky for such equipment repair and rebuilding facilities to own and maintain. Thus, there is a need for a simple and inexpensive means by which a rebuilt or repaired automatic transmission can be tested before it is reinstalled. It is the object of this invention to provide a solution to this problem.

BRIEF DESCRIPTION OF THE INVENTION

The invention provides a simple, readily portable tool which can be installed on the rebuilt transmission to subject it to power in much the same way as the transmission will be required to operate when finally installed in the vehicle. The invention provides an assembly which is detachably mounted on the bell housing of the transmission and connected to the torque converter so that power can be delivered to the transmission through the torque converter. Further, the equipment is so designed that it is adjustable to fit bell housings of various designs and sizes. Once this equipment is attached to the bell housing and secured to the torque converter, the power can be supplied from any suitable source, such as, a variable speed, portable, electric drill, which is detachably secured to the shaft of the equipment in the conventional manner for such drills. At the same time, suitable equipment may be used to read out the velocity at which the transmission is driven and to measure the fluid pressure within the transmission. Such equipment is conventional and is normally available in any transmission rebuilding facility and, therefore, is not a special requirement of this invention.

The invention provides equipment which is light enough in weight to be readily handled by a single person and is compact for storage and quickly and easily mounted and removed from the transmission. Thus, it is equipment which is well within the budgetary limitations even of the small automatic transmission rebuild or repair shop.

DESCRIPTION OF THE PREFERRED EMBODIMENT

Figure 3:
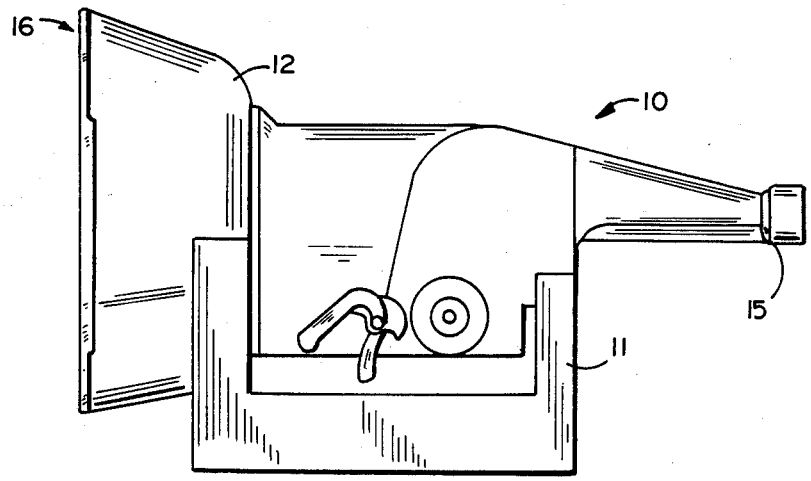
FIG. 3 is a side elevation view of an automatic transmission resting in a cradle and before installation of the invention.
Figure 4:
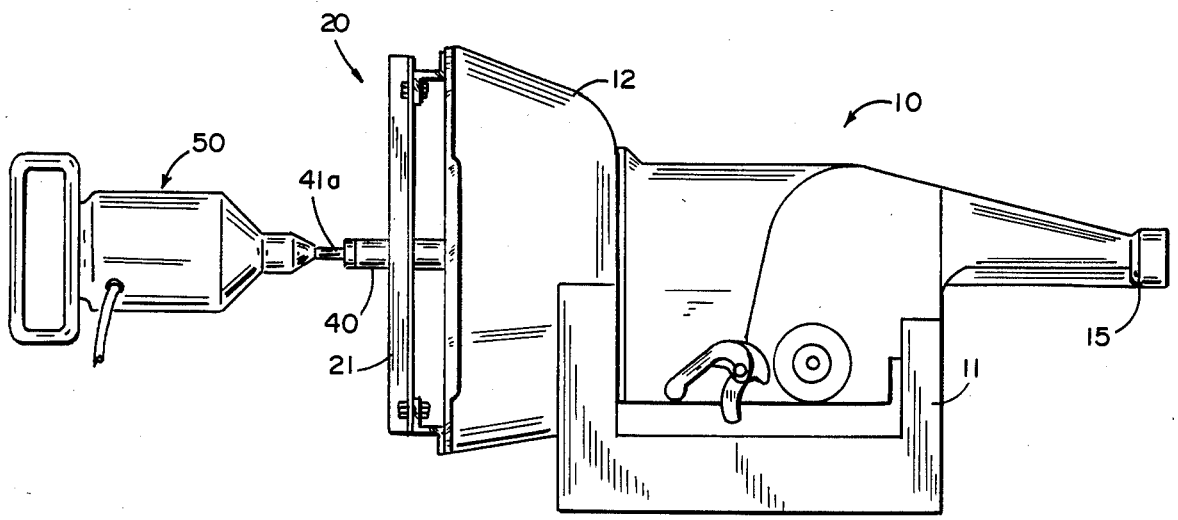
FIG. 4 is a view similar to FIG. 3 after installation of the invention.
Figure 5:
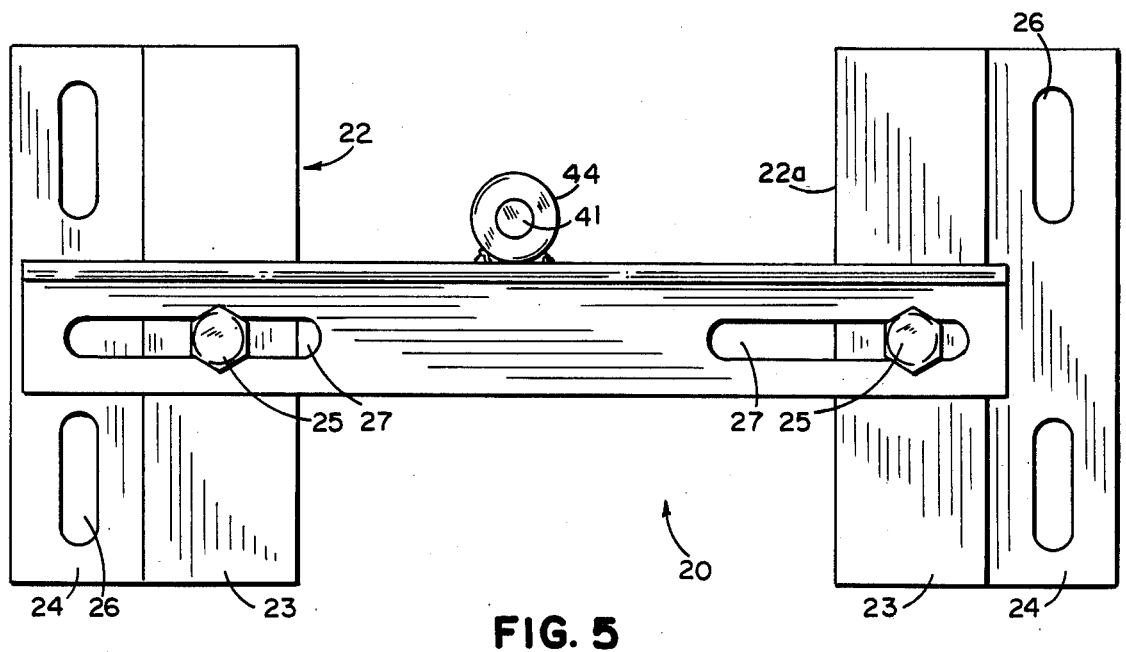
FIG. 5 is an enlarged front view of the cradle assembly of the invention.
Figure 6:
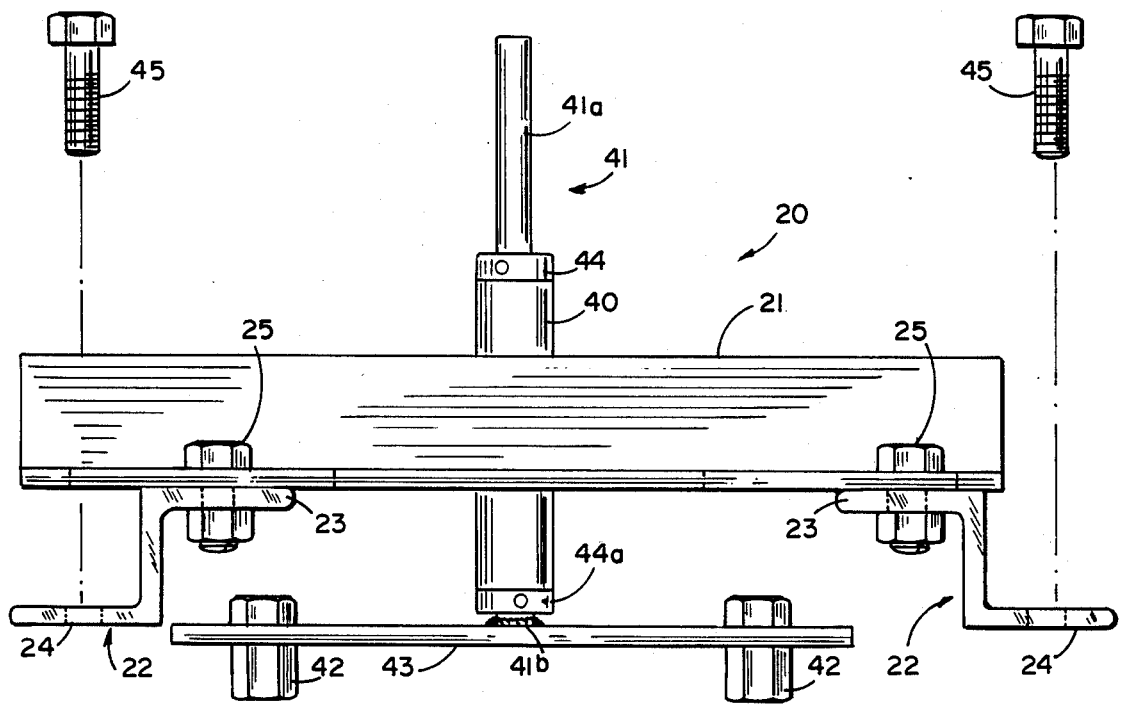
FIG. 6 is an enlarged side view of the cradle assembly of the invention.

As illustrated in FIG. 3, a rebuilt automatic transmission 10 is mounted on a cradle 11 which supports the transmission in basically the attitude it will assume when it is again installed in the vehicle from which it was removed. The cradle need be nothing more than the type of fixture normally available in any automatic transmission rebuilding facility, whether the facility is large or small. As viewed in FIG. 1, the transmission is seen from the front end through the open end of the bell housing 12 which normally bolts to the engine used to propel the vehicle.

Figure 1:
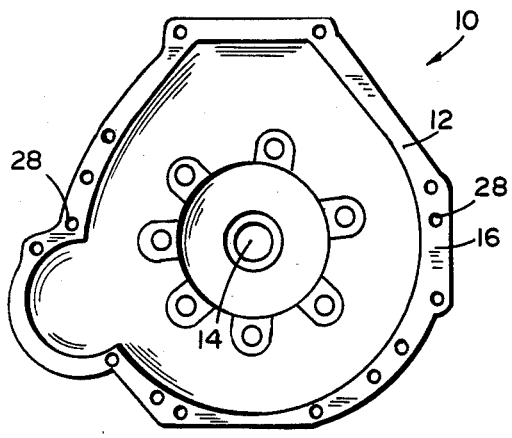
FIG. 1 is a front end view of an automatic transmission with the torque converter removed.
Figure 2:
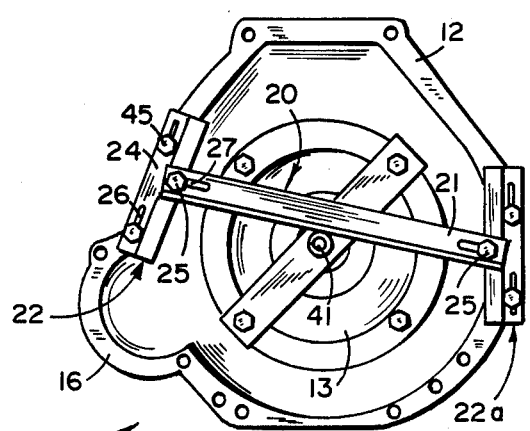
FIG. 2 is a view similar to FIG. 1 after the torque converter and the invention have been mounted on the transmission.

In FIG. 1, the transmission is illustrated with the torque converter 13 removed. FIG. 2 illustrates the equipment with the torque converter mounted to the transmission and through which the transmission will be driven by means of this invention. The torque converter is normally a sealed unit which is not serviced in the standard transmission rebuild shop because of the lack of facilities for dealing with equipment of this type. As seen in FIG. 1, substantially at the center of the bell housing is an input shaft 14 to the end of which the torque converter, as illustrated in FIG. 2, is mounted. The opposite end of the transmission provides a facility for connecting an output shaft at 15. The equipment which has been described up to this point is conventional and it is described only to provide a background environment for the invention which is about to be described.

To provide means to power the transmission when it has been removed from its vehicle, a saddle 20 is provided. The saddle includes a cross bar or beam 21, at each end of which is an anchor bracket 22. The anchor bracket is preferably a Z-shaped section having a pair of parallel flanges 23 and 24, one of which, flange 23, is secured to and beneath the cross bar 21. The second flange 24 is designed to seat against the flat forward face 16 of the open end of the bell housing 12. It will be noted that the anchor brackets are secured to the cross bar 21 by means of a bolt 25 which, if loosened, permits the anchor bracket to be independently rotated about the bolt so that the slotted opening 26 in the flange 24 can be made to align with one of the threaded openings 28 existing in the end face 16 of the bell housing 12. This is important because the bell housing provides a number of threaded openings, although the pattern of these openings may vary from one transmission make or size to another. Further, it will be noted that the mounting bolts 25 which secure the end brackets 22 and 22a to the cross beam 21 also pass through slots 27 extending lengthwise of the cross bar 21. This permits the spacing between the anchor brackets to be adjusted according to the size of the bell housing and the hole spacing in its end face. Thus, there is adjustability both in the spacing between the anchor brackets and in the angular position of the anchor brackets with respect to the axis of the cross bar. The slotted openings make it possible to accommodate a wide variety of hole patterns in the end face of the bell housing. Thus, the saddle is made adjustable to meet the necessities of a large number of transmission sizes and designs. This is essential because the axial center of the shaft 41 must align with the axial center of the torque converter since it will be rigidly secured to the torque converter.

Midway between the ends of the cross bar an elongated journal 40 is provided and welded to the cross bar. While the journal is illustrated as being mounted to one side of the cross bar, it could be made to extend through it. The journal is of a length and has an opening of the proper internal diameter to rotatably mount the shaft 41 and support it against any type of eccentric motion. The shaft extends through the journal and has an outwardly extending portion 41a and an inwardly extending portion 41b. An anchor member 43 is secured to the inner end of the portion 41b. The anchor member 43 is basically an elongated bar each end of which mounts a bushing 42 for an anchor bolt to secure the anchor member to the torque converter 13. The spacing between the cross bar 21 of the saddle 20 and the face of the torque converter or the flex plate to which the anchor member is to be secured can be adjusted by loosening the collars 44 and 44a and shifting the shaft 41 axially until the attachment between the anchor member and the torque converter has been completed. The inner end of the shaft 41 can be provided with whatever type of connecting facility is necessary to provide a driving connection with the torque converter. The collars 44 and 44a can then be reattached in an appropriate position to limit axial movement of the shaft 41 without any binding effect with the journal 40.

Preferably, in mounting the saddle 20 to the transmission, the initial procedure is to secure the anchor member to the appropriate points of attachment on the torque converter using the stud facilities or openings which already exist on the torque converter. This arrangement will automatically align the saddle assembly 20 with the central axis of the torque converter. Once this has been done, then the angular position and spacing of the end brackets can be adjusted to find appropriate threaded openings in the end face of the bell housing which permit them to be attached by means of suitable bolts 45. Either before or after this is done, appropriate instrumentation is attached to the transmission in a conventional manner to provide information concerning the pressure of the transmission fluid. A tachometer can be attached to the shaft 41 to provide accurate information concerning the speed at which the transmission is being driven. Before applying power to the transmission it must be filled with transmission fluid and the orifices for the fluid cooler lines must be capped. If necessary, suitable means can be attached to the tail or drive shaft end of the transmission to prevent loss of fluid through that opening.

To operate the transmission, a conventional, portable, variable speed, half-inch, electric or pneumatic drill 50 is secured to the outer end 41a of the shaft. By operating the drill motor at various speeds, the operation of the rebuilt transmission can be observed not only through the instrument readings but, in the case of a mechanic of seasoned experience, by also listening to the transmission. Particularly, it is important to observe the readings on the pressure gauge and to thoroughly inspect the transmission for any possible leakages such as sometimes occur because of an improperly installed or a defection gasket or damage to the housing which, for some reason, was not observed during the rebuilding.

By setting the drill's output at about 800 rpm, the transmission will be operated at a sufficient speed to test its operating characteristics and provide evidence of possible leakage. However, if a more severe test is desired, the speed can be increased up to about 2000 rpm which will provide data comparable to the transmission's normal operating conditions. All of the transmissions have openings which can be unplugged for access to the transmission fluid and provide pressure readings.

If such a fault is observed, the transmission can then be returned to a repair site where it can be worked on without the substantial investment in time necessary to mount the transmission and again dismount it from the vehicle with which it is normally used. The mounting and removal of the test equipment takes a very short period of time. The instrumentation necessary for the test is conventional and would be used on the transmission after it had been installed in a vehicle utilizing the conventional methods now employed as standard practice. The drill motor is a standard item of bench equipment available in all transmission rebuilding facilities and is, therefore, not an added expense. Once the test is completed, the saddle 20 can be removed in a matter of minutes. Its compactness and its simplicity make it light enough to be easily handled by the operator and its compactness permits it to be stored in a very limited space where it will not interfere with the normal operations of the shop. The result is a major reduction in the cost of labor and time often invested in a transmission rebuild and reconditioning procedure. It also materially reduces the complexity of the test procedure without requiring any substantial investment on the part of the facility in which it is used.

Having described the preferred embodiment of my invention and its use, it will be recognized that modifications of the invention can be made without departing from the principles of the invention and such modifications are to be considered as included within the hereinafter appended claims, unless these claims by their language expressly state otherwise.

I claim:

1. A portable machine for testing a rebuilt automatic transmission having a bell housing and a torque converter assembly prior to installation on the vehicle, said machine comprising: a saddle having a cross bar and a pair of brackets, one adjacent each end, means for varying both the spacing between and the angular position of said brackets with respect to the longitudinal axis of said cross bar, each of said brackets having a foot portion adapted to seat against the forward end surface of the transmission's bell housing for receiving a fastener element for detachably securing it to said bell housing; a journal secured to said cross bar and a shaft rotatably mounted in said journal; the axis of said shaft being aligned with the axis of said torque converter; an anchor member rigidly fixed to said shaft between said brackets, a pair of bosses, one adjacent each end of said member and threaded means for securing said bosses to the transmission's torque converter; the opposite end of said shaft being adapted to be secured to a portable source of variable speed rotary motion.

2. In the method for testing a rebuilt automatic transmission and torque converter assembly prior to reinstallation on a vehicle, the steps which include providing a bracket of a size to extend from one side of the bell housing to the other and intermediate its ends having a rotatably mounted shaft, detachably securing the bracket to the bell housing of the transmission using existing fastener openings in the housing and aligning the axis of the shaft with the axis of rotation of the torque converter, the shaft having torque delivery anchor means on one end, detachably securing the anchor means to the torque converter, operatively connecting a portable, variable speed drill motor to the opposite end of said shaft; securing a pressure gauge to the transmission in such a manner that it can display information concerning fluid pressure in the transmission; operating the drill motor in the range of about 800 to about 2000 rpm while observing the readings displayed by the pressure gauge and inspecting the transmission for leakage.

3. In the method for testing a rebuilt automatic transmission and torque converter assembly prior to reinstallation on a vehicle, the steps which include temporarily supporting said transmission and torque converter assembly with the axis of said assembly aligned in the manner in which it will be operated in a vehicle, providing an adjustable bracket having a rotatably mounted shaft substantially at its center, the shaft having a torque delivery means at one end, placing the bracket against the front face of the bell housing of the transmission and aligning the axis of the shaft with the central axis of the torque converter, connecting the torque delivery means to the torque converter, operatively connecting a portable, variable speed drill motor to the end of said shaft opposite from said torque delivery means; securing a pressure gauge to the transmission in such a manner that it can display information concerning fluid pressure in the transmission; operating the drill motor in the range of about 800 to about 2000 rpm while observing the readings displayed by the pressure gauge and inspecting the transmission for leakage.

4. A portable machine for testing a rebuilt automatic transmission having a bell housing and a torque converter assembly prior to installation on the vehicle, said machine comprising: a saddle having a cross bar and a pair of brackets, one adjacent each end, each of said brackets having a foot portion adapted to seat against the forward end surface of the transmission's bell housing for receiving a fastener element for detachably securing it to said bell housing; a journal secured to said cross bar and a shaft rotatably mounted in said journal; the axis of said shaft being aligned with the axis of said torque converter; first means for separately adjusting the spacing between said brackets and second means for adjusting the position of said journal lengthwise of said bar, third means permitting the selection of different ones of the openings in the bell housing to effect alignment of the axes of said shaft and torque converter; the opposite end of said shaft being adapted to be secured to a portable source of variable speed rotary motion.

* * * * *